United States Patent [19]
Korenko

[11] Patent Number: 4,494,987
[45] Date of Patent: Jan. 22, 1985

[54] PRECIPITATION HARDENING AUSTENITIC SUPERALLOYS

[75] Inventor: Michael K. Korenko, Wexford, Pa.

[73] Assignee: The United States of America as represented by the United States Department of Energy, Washington, D.C.

[21] Appl. No.: 370,438

[22] Filed: Apr. 21, 1982

[51] Int. Cl.³ .................. G21C 1/00; G21C 3/58; C22C 30/00

[52] U.S. Cl. .................. 75/124; 75/126 D; 75/126 G; 75/128 E; 75/128 T; 376/457; 376/463

[58] Field of Search ............ 75/124, 124 D, 126 G, 75/124 CB, 128 E; 376/463, 457

[56] References Cited

U.S. PATENT DOCUMENTS

| | | | |
|---|---|---|---|
| 2,581,420 | 1/1952 | Lohr | 75/124 CB |
| 2,687,954 | 8/1954 | Lohr | 75/124 CB |
| 3,170,847 | 2/1965 | Dudek et al. | 376/457 |
| 3,563,728 | 2/1971 | Allio et al. | 376/457 |
| 3,746,536 | 7/1973 | Kuse | 75/126 G |
| 4,144,380 | 3/1979 | Beltran et al. | 75/134 F |
| 4,158,606 | 6/1979 | Bloom et al. | 376/463 |
| 4,234,385 | 11/1980 | Ozaki et al. | 376/457 |
| 4,236,943 | 12/1950 | Korenko et al. | 75/134 F |
| 4,261,767 | 4/1981 | Davidson | 75/124 F |
| 4,359,350 | 11/1982 | Laidler et al. | 148/12.3 |

FOREIGN PATENT DOCUMENTS 109116  2/1974  Japan ................. 75/124 F

OTHER PUBLICATIONS

Karl Wirtz, Lectures on Fast Reactors, American Nuclear Society, 1978, pp. 182–201.

*Primary Examiner*—Veronica O'Keefe
*Attorney, Agent, or Firm*—John J. Prizzi

[57] ABSTRACT

Precipitation hardening, austenitic type superalloys are described. These alloys contain 0.5 to 1.5 weight percent silicon in combination with about 0.05 to 0.5 weight percent of a post irradiation ductility enhancing agent selected from the group of hafnium, yttrium, lanthanum and scandium, alone or in combination with each other. In addition, when hafnium or yttrium are selected, reductions in irradiation induced swelling have been noted.

22 Claims, No Drawings

PRECIPITATION HARDENING AUSTENITIC SUPERALLOYS

GOVERNMENT CONTRACT CLAUSE

The present invention was made or conceived during the performance of work under Contract No. EY-76-C-14-2170 with the U.S. Department of Energy.

CROSS-REFERENCE TO RELATED APPLICATION

Maraging superalloys and their method of heat treatment are described in U.S. patent application Ser. No. 370,439 filed on Apr. 21, 1982 as a continuation in part of U.S. patent application Ser. No. 305,411 filed on Sept. 24, 1981 and now abandoned. These alloys are ferritic in nature.

BACKGROUND OF THE INVENTION

The present invention pertains to precipitation hardening austenitic superalloys for use in neutron radiation environments. It especially relates to gamma prime hardening austenitic superalloys.

In fast breeder nuclear reactors of the liquid metal type, as well as in other, the fuel is encapsulated in cladding, typically of cylindrical form. A capsule containing the fuel is usually referred to as a fuel element or fuel rod. In accordance with the teachings of the prior art, the cladding is composed of stainless steel, typically AISI 316 stainless steel. The ducts through which the liquid metal (typically sodium) flows are also composed of this 316 steel. In practice, difficulty has been experienced both with the cladding and the ducts. The stainless steel on being bombarded by neutrons, particularly where the neutron flux is epithermal (E>0.1 MeV), swells. In addition, the stainless steel does not have the necessary strength at the elevated temperatures, 500° C. and higher, at which the reactors of the type involved operate. The problem is particularly serious in the case of the cladding. On being heated by the fission reaction, the fuel in tne capsules expands and in addition gas is generated and exerts high pressure at the high temperatures within the capsules. The cladding is highly stressed. The stress exerted in the ducts is at a lower level both because the temperature of the ducts is lower than that of the cladding and also because the mechanical pressure to which the ducts are subjected is lower. The stainless steel of the cladding and of the ducts is subject to substantial creep which is accentuated by the neutron irradiation.

Various alloys have been considered in efforts to provide improved cladding and duct materials. Among the alloys studied have been gamma prime hardened austenitic superalloys such as those described in U.S. Pat. Nos., 3,199,978; 4,129,462; 4,172,742; 4,231,795; and 4,236,943. In addition to the metallurgical conditions described in the listed patents, some of these alloys have also been studied in a solution treated and cold worked condition, as described in copending application Ser. No. 248,121 filed on Mar. 27, 1981 which issued as U.S. Pat. No. 4,359,350 on Nov. 16, 1982. These gamma prime austenitics can generally be designed to have good swelling resistance, high strength and high stress rupture strength relative to austenitic alloy 316.

The post irradiation ductility of these alloys as a class has been found to be at, or near, zero depending on alloy composition, heat treatment, irradiation temperature and fluence. Exposing gamma prime austenitics to a high energy neutron (E>0.1 MeV) flux in the as cold worked condition, as described in U.S. Pat. No. 4,359,350, has provided some improvement in the post irradiation ductility. However, the post irradiation ductility still is a concern, and there exists a need for further improvement in this area.

BRIEF SUMMARY OF THE INVENTION

It has been found that the addition of about 0.05 to 0.5 weight percent of yttrium, hafnium, or scandium to precipitation hardening austenitics provides a significant improvement in the post irradiation ductility of these alloys. It has further been found that the swelling resistance of these alloys is also improved when yttrium or hafnium is added. It has also been found that the improvement in post irradiation ductility appears to be dependent upon the presence of silicon in the alloy, preferably in the range of about 0.5 to 1.5 weight percent. It is believed that lanthanum may be substituted for all or part of the yttrium, hafnium and scandium additions, in that it is also beleved to provide improvement in the swelling resistance and post irradiation ductility of these alloys.

Preferred alloys in accordance with the present invention fall within the following composition ranges:
about 7–17 weight percent chromium;
about 24–45 weight percent nickel;
about 2–3.8 weight percent titanium;
about 0.5–2.2 weight percent aluminum;
about 0.8–3.5 weight percent molybdenum;
about 0.5–1.5 weight percent silicon;
about 0.03–0.06 weight percent carbon;
and about 0.05–0.5 weight percent of an element selected from the group of yttrium, hafnium and scandium, alone or in combination with each other.

Preferably the balance of the alloy is essentially iron except for impurities. However, other elements such as boron and zirconium may also be added in small amounts. Manganese may be present at a level of up to about 2 weight percent.

While the observed improvements in post irradiation ductility have been observed in alloys in a solution treated and aged condition, it is believed that these improvements will also be produced in alloys exposed to irradiation in a cold worked condition, and in a cold worked and aged condition.

These and other aspects of the present invention will become more apparent upon review of the following detailed description of the present invention.

TABLE I

NOMINAL COMPOSITIONS

| Alloy | Ni | Cr | Mo | Si | Mn | Zr | Ti | Al | C | B | Other* |
|---|---|---|---|---|---|---|---|---|---|---|---|
| Base | 25 | 7.5 | 1.0 | 1.0 | 0.2 | .05 | 3.3 | 1.7 | .05 | .005 | — |
| 2 | 25 | 7.5 | 1.0 | — | 0.2 | .05 | 3.3 | 1.7 | .05 | .005 | 0.2 Sc |
| 6 | 25 | 7.5 | 1.0 | 1.0 | 0.2 | .05 | 3.3 | 1.7 | .05 | .005 | 0.2 Sc |
| 3 | 25 | 7.5 | 1.0 | — | 0.2 | .05 | 3.3 | 1.7 | .05 | .005 | 0.2 Y |
| 7 | 25 | 7.5 | 1.0 | 1.0 | 0.2 | .05 | 3.3 | 1.7 | .05 | .005 | 0.2 Y |
| 4 | 25 | 7.5 | 1.0 | — | 0.2 | .05 | 3.3 | 1.7 | .05 | .005 | 0.2 Hf |
| 8 | 25 | 7.5 | 1.0 | 1.0 | 0.2 | .05 | 3.3 | 1.7 | .05 | .005 | 0.2 Hf |

*Balance of all alloys is essentially iron, except for impurities

TABLE II

CHEMICAL ANALYSES

| | Alloy | | |
|---|---|---|---|
| Element | Base | 7 | 8 |
| Ni | 24.54 | 25.14 | 25.04 |
| Cr | 7.72 | 7.58 | 7.57 |

TABLE II-continued

| | CHEMICAL ANALYSES | | |
|---|---|---|---|
| | | Alloy | |
| Element | Base | 7 | 8 |
| Mo | 1.04 | 1.03 | 1.02 |
| Si | .98 | 1.06 | .96 |
| Mn | .23 | .21 | .21 |
| Zr | .054 | .051 | .056 |
| Ti | 3.16 | 3.21 | 3.20 |
| Al | 1.62 | 1.70 | 1.59 |
| C | .050 | .053 | .056 |
| B | .0047 | .0063 | .0054 |
| P* | <.005 | .005 | <.005 |
| S* | .003 | .001 | .003 |
| Cb* | <.01 | <.01 | <.01 |
| Hf | — | — | .35 |
| Y | — | .091 | — |

*incidental impurity

DETAILED DESCRIPTION OF THE INVENTION

In order to demonstrate the advantages of the present invention, alloys having the nominal compositions shown in Table I were melted. It will be noted upon review of Table I that a gamma prime hardening austenitic base composition was selected and then additions of about 0.2 weight percent scandium, yttrium or hafnium were made to the base composition while varying the silicon content of the base composition between about 1.0 weight percent and about zero (i.e., impurity levels). In this manner seven alloys having the nominal compositions shown in Table I were melted into ingots. While it is desired to hold the levels of the other alloying elements constant from ingot to ingot, normal ingot to ingot variability in chemistry did occur. Examples of the variability observed are indicated by the chemical analyses shown in Table II. This variability is not believed to have had a significant affect on the determination of the effect of additions of scandium, yttrium and hafnium, with and without silicon, on the swelling resistance and post irradiation ductility of the alloys studied.

The ingots representing the alloys shown in Table I were first hot worked to an intermediate size to improve the chemical homogeneity within the ingot and substantially remove the as cast microstructure of each ingot. After hot working, the intermediate size products were cold worked to final size in a series of steps having intermediate solution anneals between each cold working step.

For example, the Base, #7 and #8 alloy ingots were intially soaked for about 1 to 1½ hours at about 1150° C. They were then press forged at about 1150° C. to a flat bar having a nominal thickness of about ⅝ inch. Subsequently, each ingot received a homogenization treatment which entailed soaking the ingot at about 1225° C. for about one hour followed by about a 2 hour soak at about 1275° C. and then furnace cooling. Intermediate product from each of these three ingots was then cold worked in steps to substantially final size. The reductions utilized in each step typically varied from about 25 to 45 percent. Intermediate solution anneals at about 1150° C. for about ¾ hour followed by furnace cooling were performed between each cold working step. The last cold working step comprised about a 25% reduction.

After the last cold working step, material from each of the heats shown in Table I were solution treated and aged as follows:

1. Solution treating was performed by soaking at about 1050° C. for about ½ hour and was followed by air cooling.

2. Aging was then performed by soaking at about 800° C. for about 11 hours followed by air cooling. A secondary aging treatment was then performed by soaking at about 700° C. for about 8 hours followed by air cooling.

Samples of the fully fabricated and heat treated alloys were then irradiated in fast neutron fluxes to various fluences and at various temperatures. The addition of hafnium and yttrium to the base alloy were found to significantly improve swelling resistance as demonstrated in Table III. Scandium, however, had no significant affect on swelling resistance.

TABLE III

| | SWELLING CHARACTERISTICS | | | |
|---|---|---|---|---|
| Irrad-iation | Neutron Fluence | Percent Volume Expansion* | | |
| Temp. °C. | $\times 10^{22}$ n (E >0.1 MeV)/cm$^2$ | Base Alloy | Alloy #7 | Alloy #8 |
| 400 | 5.9 | 0.72 | −0.49 | −0.47 |
| 427 | 6.8 | 1.29 | −0.32 | −0.33 |
| 454 | 5.7 | 0.73 | — | — |
| 482 | 6.7 | 0.86 | — | — |
| 510 | 7.4 | 1.36 | — | — |
| 538 | 7.4 | 2.23 | 0.91 | — |
| 593 | 7.8 | 0.61 | −0.20 | −0.06 |
| 650 | 7.7 | 0.41 | −0.37 | −0.44 |

*Negative values indicate a volume contraction

Additional samples irradiated at selected temperatures and fluences indicated in Table III were characterized as to their post irradiation ductility. These ductility results are shown in Table IV.

TABLE IV

| | POST IRRADIATION DUCTILITY AS MEASURED BY DISC BEND TESTING | | | | | | | |
|---|---|---|---|---|---|---|---|---|
| | | Percent Strain, | | | | | | |
| Irradiation Temp. °C. | Test Temp. °C. | Base Alloy | Alloy #2 (Sc no si) | Alloy #6 (Sc) | Alloy #3 (Y no si) | Alloy #7 (Y) | Alloy #4 (Hf no si) | Alloy #8 (Hf) |
| 454 | 564 | 0.7 | 0.2 | — | — | — | 0.7 | — |
| 482 | 592 | — | 1.0* | V.D.** | 0.1 | V.D.** | — | V.D.** |
| 510 | 620 | 0.4 | 0.5 | 2.1 | 0.9 | 5.0 | 0.3 | 2.2 |
| 538 | 648 | 0.3 | 0.5 | 1.2 | 0.3 | 1.1 | 0.5 | 0.8 |
| 593 | 703 | 0.6 | — | — | 0.3 | — | — | — |

*tested at 564° C. rather than 592° C.
**V.D. = very ductile, i.e., ductility greater than 5%

The disc bend ductility test used to test these alloys is a specially designed microductility test in which an indentor is pushed through a thin disc-shaped sample of the test material. The strain, ε, or measure of ductility provided by this test has been correlated with tensile test results. The correlation between these two tests is accurate for low ductility materials. The discs are typically about ⅛ inch or 3 mm. in diameter and approximately 0.009–0.014 inch thick.

The ductility test results shown in Table IV indicate that a significant improvement in the gamma prime hardened base alloy post irradiation ductility is obtained by the addition of scandium, yttrium or hafnium to the base alloy composition. However, it is also indicated that where the alloy contains no significant quantity of silicon, these additions did not enhance ductility.

It is therefore believed that when about 0.05 to 0.5 weight percent of scandium, yttrium and/or hafnium is added to a gamma prime hardening austenitic alloy containing an effective amount of silicon the post irradiation ductility of the alloy should be enhanced. It is preferred that silicon be present at a level of about 0.5 to 1.5 weight percent. In addition it is believed that lanthanum may be substituted for all or part of the scandium, yttrium and hafnium.

It is also believed that the benefits of the present invention are also applicable to gamma prime hardening austenitics which are placed in pile in a cold worked and aged condition or a cold worked condition. Typical of the treatments that may be utilized are as follows:

TREATMENT I

1. Solution treat at about 950° to 1150° C.
2. Cold work 20-80%, preferably 30 to 60%
3. Age at one or more temperatures.

TREATMENT II

1. Solution treat at about 950° to 1150° C.
2. Cold work 10-60%, preferably 15 to 30%.

The present invention provides an improved precipitation strengthening austenitic superalloy for liquid metal fast breeder reactor ducts and fuel pin cladding.

While the invention has been described in connection with specific embodiments, it will be readily apparent to those skilled in the art that various changes in compositional limits and heat treatments can be made to suit arrangements without departing from the spirit and scope of the invention.

I claim:

1. An iron base, gamma prime precipitation hardening austenitic superalloy having improved ductility characteristics after neutron irradiation in a fast breeder nuclear reactor, comprising an iron-nickel-chromium alloy including about 0.05-0.5 weight percent of a ductility enhancing agent selected from the group consisting of yttrium, hafnium and scandium, alone or in combination with each other, titanium and aluminum in amounts effective to produce gamma prime hardening during thermal aging outside of said fast breeder nuclear reactor and silicon in an amount effective through interaction with said ductility enhancing agent to enhance the post neutron irradiation ductility of said alloy.

2. The superalloy according to claim 1 wherein silicon comprises about 0.5 to about 1.5 weight percent of said alloy.

3. The superalloy according to claim 1 or 2 wherein said ductility enhancing agent is yttrium.

4. The superalloy according to claim 1 wherein said alloy contains said gamma prime phase alloy.

5. The superalloy according to claim 2 wherein said alloy contains said gamma prime phase.

6. A gamma prime strengthened austenitic superalloy comprising:
   about 7-17 weight percent chromium;
   about 24-45 weight percent nickel;
   about 2-3.8 weight percent titanium;
   about 0.5-2.2 weight percent aluminum;
   about 0.8-3.5 weight percent molybdenum;
   about 0.5-1.5 weight percent silicon;
   about 0.03-0.06 weight percent carbon;
   about 0.05-0.5 weight percent of an element selected from the group consisting of yttrium, hafnium and scandium, alone or in combination with each other; and
   wherein iron is essentially the balance of said gamma prime strengthened austenitic superalloy.

7. The superalloy according to claim 6 further comprising up to about 2 weight percent manganese.

8. The superalloy according to claim 6 wherein said superalloy has improved fast neutron irradiation swelling properties and wherein said element is selected from the group consisting of hafnium and yttrium, alone or in combination with each other.

9. A duct for fuel pins, wherein said duct is comprised of the superalloy according to claim 1, 2 or 6.

10. A fuel pin cladding comprised of the superalloy according to claim 1, 2 or 6.

11. The superalloy according to claim 4, 5 or 6 fabricated by the process comprising the steps of:
   solution treating said superalloy; later aging said superalloy; and
   subsequently placing said superalloy in said fast breeder reactor in an aged condition.

12. The superalloy according to claim 1 or 2 fabricated by the process comprising the step of:
   cold working said superalloy; and later placing said superalloy in pile in a cold worked condition.

13. The superalloy fabricated by the process according to claim 12 further comprising the step of:
   aging said superalloy after said cold working and prior to placing said superalloy in said fast breeder nuclear reactor.

14. A gamma prime precipitation hardening austenitic superalloy having the following nominal composition:
   about 25 weight percent Ni;
   about 7.5 weight percent Cr;
   about 1.0 weight percent Si;
   about 1.0 weight percent Mo;
   about 0.2 weight percent Mn;
   about 0.05 weight percent Zr;
   about 3.3 weight percent Ti;
   about 1.7 weight percent Al;
   about 0.05 weight percent C;
   about 0.005 weight percent B;
   about 0.2 weight percent of an agent for enhancing the post neutron irradiation ductility of said superalloy after neutron irradiation in a fast breeder reactor selected from the group consisting of Sc, Y, La, and Hf, alone or in combination with each other; and the balance being essentially Fe.

15. The alloy according to claim 14 wherein said agent for enhancing post neutron irradiation ductility is selected from the group consisting of Y and Hf.

16. The superalloy according to claim 2 wherein said ductility enhancing agent is scandium.

17. The superalloy according to claim 2 wherein said ductility enhancing agent is hafnium.

18. The superalloy according to claim 6 wherein said element is yttrium.

19. The alloy according to claim 14 wherein said agent for enhancing post neutron irradiation ductility is Y.

20. The alloy according to claim 6 wherein said element is limited to a concentration of about 0.2 to 0.5 weight percent.

21. The alloy according to claim 1 wherein said ductility enhancing agent is limited to a concentration of about 0.2 to 0.5 weight percent.

22. The alloy according to claim 2 wherein said ductility enhancing agent is limited to a concentration of about 0.2 to 0.5 weight percent.

* * * * *